United States Patent
Berezin et al.

(10) Patent No.: US 10,300,886 B2
(45) Date of Patent: May 28, 2019

(54) KEYLESS CONTROL SYSTEM

(71) Applicant: GM Global Technology Operations LLC, Detroit, MI (US)

(72) Inventors: Vyacheslav Berezin, New Market (CA); Amanda J. Kalhous, Ajax (CA); Nikola J. Pudar, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/070,814

(22) Filed: Mar. 15, 2016

(65) Prior Publication Data
US 2017/0267213 A1    Sep. 21, 2017

(51) Int. Cl.
*B60R 25/20* (2013.01)
*B60K 35/00* (2006.01)
*B60R 25/23* (2013.01)

(52) U.S. Cl.
CPC ............ *B60R 25/209* (2013.01); *B60K 35/00* (2013.01); *B60R 25/23* (2013.01)

(58) Field of Classification Search
CPC . B60R 25/23; B60R 25/1006; B60R 2225/00; B60R 25/018; B60R 25/209; G07C 9/00698; B60K 35/00
See application file for complete search history.

(56) References Cited

U.S. PATENT DOCUMENTS

| | | | | | |
|---|---|---|---|---|---|
| 3,633,167 | A | * | 1/1972 | Hedin | G07C 9/00039 340/5.22 |
| 3,751,718 | A | * | 8/1973 | Hanchett, Jr. | G07C 9/00698 307/10.4 |
| 3,895,185 | A | * | 7/1975 | Ramsey | H03M 5/00 178/17.5 |
| 3,953,769 | A | * | 4/1976 | Sopko | G07C 9/00674 340/5.28 |
| 4,408,251 | A | * | 10/1983 | Kaplan | G07C 9/0069 307/10.4 |
| 4,425,597 | A | * | 1/1984 | Schramm | G07C 9/00682 307/10.4 |
| 4,455,588 | A | * | 6/1984 | Mochida | G07C 9/00682 307/10.4 |
| 4,485,381 | A | * | 11/1984 | Lewiner | G07C 9/00682 340/11.1 |

(Continued)

*Primary Examiner* — Thomas E Worden
(74) *Attorney, Agent, or Firm* — Reising Ethington P.C.; David Willoughby

(57) ABSTRACT

A keyless entry and start system for a vehicle includes a vehicle subsystem configured to control at least one of access to an interior compartment of the vehicle and starting of the vehicle. The system further includes an actuator movable between first and second positions and a switch coupled to the actuator. The switch assumes a first state when the actuator is in the first position and a second state when the actuator is in the second position. The system further includes a controller coupled to the switch and configured to detect an actuation sequence of the actuator, the actuation sequence corresponding to an access code. The controller is further configured to compare the access code to an authorization code and generate a control signal configured to cause the vehicle subsystem to switch states when the entry code corresponds to the authorization code.

17 Claims, 3 Drawing Sheets

(56) References Cited

U.S. PATENT DOCUMENTS

| | | | | |
|---|---|---|---|---|
| 4,499,462 | A * | 2/1985 | Stoesser | G07C 9/00682 340/12.17 |
| 4,654,745 | A * | 3/1987 | Corby | G08B 29/046 340/543 |
| 4,721,954 | A * | 1/1988 | Mauch | G07C 9/00103 235/382 |
| 4,754,255 | A * | 6/1988 | Sanders | B60R 25/04 180/287 |
| 5,555,172 | A * | 9/1996 | Potter | B60N 2/0244 340/990 |
| 6,556,124 | B1 * | 4/2003 | Laroche | B60R 25/20 307/10.2 |
| 7,248,151 | B2 * | 7/2007 | McCall | B60R 25/2045 340/425.5 |
| 8,220,877 | B2 * | 7/2012 | Makishima | B60T 7/22 188/158 |
| 9,760,698 | B2 * | 9/2017 | Pisz | B60H 1/00657 |
| 2008/0048021 | A1 * | 2/2008 | Shieh | G06Q 10/02 235/380 |
| 2011/0090097 | A1 * | 4/2011 | Beshke | B60R 25/23 341/20 |
| 2012/0306614 | A1 * | 12/2012 | Kaufman | G07C 9/00944 340/5.28 |
| 2013/0170327 | A1 * | 7/2013 | Peters | G04G 99/006 368/62 |
| 2014/0253466 | A1 * | 9/2014 | Brewer | G06F 3/03545 345/173 |
| 2016/0098136 | A1 * | 4/2016 | Lobo | G06F 21/31 345/174 |
| 2017/0101076 | A1 * | 4/2017 | Krishnan | B60R 25/209 |
| 2018/0088887 | A1 * | 3/2018 | LeBlanc | G06F 3/1431 |

* cited by examiner

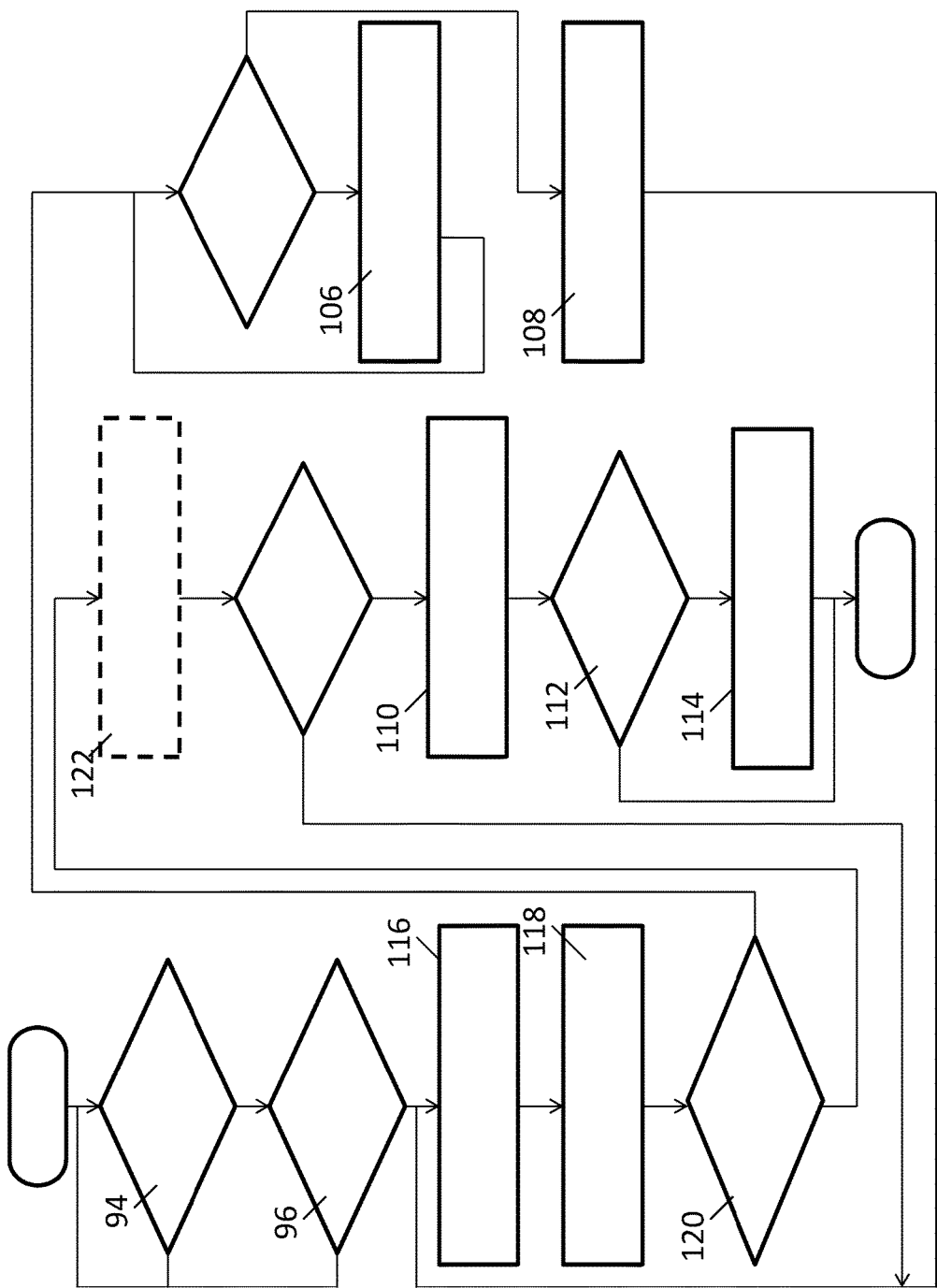

KEYLESS CONTROL SYSTEM

TECHNICAL FIELD

The present disclosure relates to keyless entry or start system for a vehicle. In particular, the present disclosure relates to a keyless entry or start system that enables a vehicle user to enter or start a vehicle when passive entry passive start components such as a key fob or mobile communications device are unavailable or fail to operate.

BACKGROUND

Many modern vehicles include passive entry passive start (PEPS) systems that enable an individual to gain entry to the vehicle and/or start the vehicle without the use of a key. These PEPS systems rely on the use of key fobs, smartphones and other mobile communications devices that transmit wireless signals to a wireless communication module in the vehicle. A controller authenticates the signals and then actuates door locks and/or starts the vehicle in response to the signals. On some occasions, the mobile communications devices used to request entry to the vehicle or start the vehicle are unavailable or inoperable. For example, typical mobile communication devices depend on batteries that have a limited lifespan. If the battery is unable to deliver power to the device or unable to deliver sufficient power for wireless signal transmission, the user cannot use the device to secure entry to the vehicle or start the vehicle. Similarly, if the user misplaces the device, the user will lack the ability to enter the vehicle or start the vehicle.

SUMMARY

According to an embodiment of the invention, there is provided a keyless control system for a vehicle including a vehicle subsystem configured to control at least one of access to an interior compartment of the vehicle and starting of the vehicle. The system further includes an actuator mounted on the vehicle and movable between first and second positions and a switch coupled to the actuator. The switch assumes a first state when the actuator is in the first position and a second state when the actuator is in the second position. The system further includes a controller coupled to the switch and configured to detect a first actuation sequence of the actuator, the first actuation sequence corresponding to an access code, and compare the access code to an authorization code. The controller is further configured to generate a control signal configured to cause the vehicle subsystem to switch between a first state and a second state when the access code corresponds to the authorization code.

According to another embodiment of the invention, there is provided a keyless control system for a vehicle including a vehicle subsystem configured to control at least one of access to an interior compartment of the vehicle and starting of the vehicle. The system further includes an actuator mounted on the vehicle and movable between first and second positions and a switch coupled to the actuator. The switch assumes a first state when the actuator is in the first position and a second state when the actuator is in the second position. The system may further include a display disposed in a cabin of the vehicle. The system further includes a controller coupled to the switch and configured to determine whether a first actuation sequence of the actuator corresponds to an authorization code. The controller makes this determination by transmitting output signals to the display, the output signals configured to cause the display to display a plurality of characters including a character of the authorization code, detecting an actuation of the actuator, determining whether the character shown on the display during the actuation of the actuator comprises the character of the authorization code and, when the character shown on the display during the actuation of the actuator comprises the character of the authorization code, repeating the transmitting, detecting, and determining actions for each additional character of the authorization code. The controller is further configured to generate a control signal configured to cause the vehicle subsystem to switch between a first state and a second state when the first actuation sequence of the actuator correspond to the authorization code.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The keyless entry or start system described below can be used when mobile communications devices used with passive entry passive start components are unavailable or inoperable. The system allows a user to move an actuator on the vehicle such as a door handle or trunk pad to communicate an access code to a controller that compares the access code to a stored authorization code and, when the codes correspond, generates a control signal to a vehicle subsystem including, for example, a door lock or a starter motor to enable entry to the vehicle or starting of the vehicle.

Figure 1:
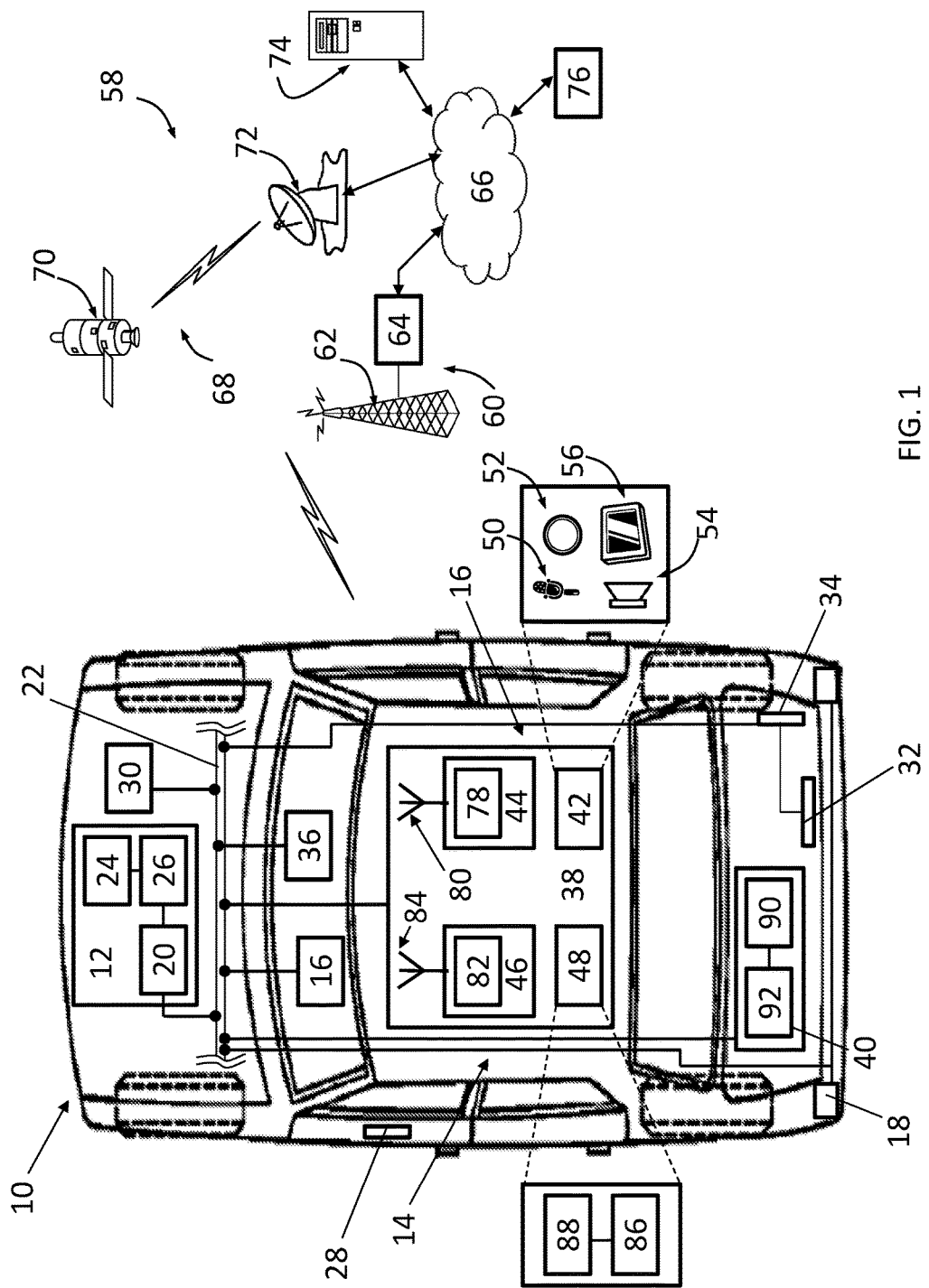
FIG. 1 is a schematic drawing illustrating a vehicle incorporating one embodiment of a keyless entry or start system in accordance with the present teachings.

Referring now to the drawings wherein like reference numerals are used to identify identical components in the various views, FIG. 1 illustrates a vehicle 10 incorporating one embodiment of a keyless entry or start system in accordance with the present teachings. Vehicle 10 is depicted in the illustrated embodiment as a passenger car, but it should be appreciated that the keyless entry or start system disclosed herein could be used or implemented in a wide variety of vehicles including trucks, sports utility vehicles (SUVs), recreational vehicles (RVs), etc. Vehicle 10 may include a variety of vehicle subsystems including, but not limited to, subsystems used to control vehicle 10 such as body control module 12 and subsystems used to provide services to occupants of vehicle 10 such as a navigation system (not shown) or infotainment system (not shown). In accordance with the present teachings, vehicle 10 may further include a keyless entry or start system 14 that enables a user of vehicle 10 to obtain entry to vehicle 10 or start vehicle 10 even when the user is unable to use passive entry passive start systems that may be included in vehicle 10.

Body control module 12 controls various electronic devices and systems within vehicle 10. Body control module 12 may control, for example, power locks for doors and rear closures, power windows, windshield wipers, remote start systems, and cruise control systems, and an information display panel among other devices and systems. In accordance with one aspect of the present teachings, body control module 12 may control various devices and systems such as a horn 16 or exterior lights 18 (e.g. daytime running lamps) that can be used to produce an audio or visual alert to individuals outside of vehicle 10 during use of system 14 as discussed in greater detail hereinbelow. Body control module 12 may include an input/output interface 20 configured to receive input signals from individual sensors and other control modules and generate output signals for use in controlling various devices and systems within vehicle 10. Interface 20 may receive and transmit signals over dedicated conductors or over a general purpose vehicle communications bus 22. Body control module 12 may further include an electronic memory device 24 that stores input data, look up tables and other data structures, and software programs and an electronic processing device 26 (e.g., a microprocessor, a microcontroller, an application specific integrated circuit (ASIC), etc.) that executes instructions for software, firmware, programs, algorithms, scripts, etc. that are stored in memory device 24. Although a body control module 12 is described herein for use in controlling horn 16 and/or exterior lights 18 for a specified purpose, it should be understood that both horn 16 and exterior lights 18 may have their own independent control modules that respond to specific inputs and generate specific outputs used in controlling horn 16 and exterior lights 18 and that system 14 may work with body control module 12 or work directly with the control modules for horn 16 and/or exterior lights 18 to generate the audio to visual alerts described hereinbelow.

Keyless entry or start system 14 allows a user of vehicle 10 to obtain entry to vehicle 10 or start vehicle 10 even when the user is unable to use passive entry passive start systems that may be included in vehicle 10. System 14 may include one or more vehicle subsystems that are configured to control access to an interior compartment of vehicle 10 or starting of vehicle 10 such as a lock system 28 or start system 30. System 14 further includes an actuator 32 and a corresponding switch 34 indicative of the state of the actuator 32. In some embodiments, system 14 may further include a display 36 for communicating information to a user of vehicle 10 and/or a telematics unit 38. Finally, system 14 includes a controller 40.

Lock system 28 is provided to control access to an interior compartment of vehicle 10 such as the cabin of vehicle 10 or a storage compartment of vehicle 10 (e.g., a trunk). System 28 may include a lock that is provided to maintain a door or a rear closure (e.g., a trunk lid or liftgate) in a closed position preventing ingress to or egress from interior compartments of vehicle 10. The lock is capable of assuming a locked state and an unlocked state. The lock may be in the form of a latch that engages a striker when the door or rear closure is closed. The latch may be disengaged from, and reengaged with, the striker using a variety of mechanical and electro-mechanical means such as external and internal door handles and motor-driven actuators that control movement of the latch to engage and disengage the striker in order to move the lock between the locked and unlocked states. A typical actuator may include a rod that engages the latch and a motor configured to control movement of the rod responsive to signals from one or more controllers including controllers acting in response to signals from a power door lock interface or from key fobs, smartphones or other mobile communications devices. In accordance with one aspect of the present teachings, the motor may also control movement of the rod responsive to signals from controller 40 of system 14 as discussed in greater detail below.

Start system 30 is provided to initiate operation of vehicle 10 in preparation for the vehicle to be driven. For an internal combustion engine (ICE) vehicle or hybrid vehicle having an ICE for the powertrain or electricity generation, the start system may be used to "turn over" or "crank" the engine of vehicle 10 in order to start the engine. For an electric vehicle, the start system may be used to direct power to portions of the vehicle electronics including in particular the powertrain and electric motors used to drive one or more of the vehicle wheels. For ICE or hybrid vehicles, start system 30 may include a starter motor and a solenoid. The starter motor may comprise a direct current motor that is provided with electrical power from the vehicle battery to start the engine. The starter motor has an inactive state (when no electrical power is supplied to the motor) and an active state (when electrical power is supplied to the motor). The solenoid closes an electric circuit through which the electrical power is transferred from the vehicle battery to the motor. For electric vehicles, the start system may include a power relay that closes an electric circuit through which the electrical power is transferred from the vehicle battery to the one or more drive motors at the wheel(s). The relay an inactive state (when no electrical power is supplied to the drive motors) and an active state (when electrical power is supplied to the drive motors). The solenoid or relay may act in response to command signals from one or more controllers including controllers acting in response to signals generated by use of actuators within the vehicle cabin such as a key lock cylinders, pushbuttons or rotary elements that are typically located on the vehicle instrument panel or steering column and by short range or long range wireless communication modules (including, e.g., telematics unit 38) configured to communicate with key fobs, smart phones and other mobile communication devices and used for remote starting of vehicle 10. In accordance with one aspect off the present teachings, the solenoid or relay may also control delivery of current to the starter motor or drive motors, respectively, in response to signals from controller 40 of system 14 as discussed in greater detail hereinbelow.

Actuator 32 and switch 34 are used by an individual to submit an access code in order to gain entry to vehicle 10 or to start vehicle 10. In accordance with one aspect of the present teachings, actuator 32 may comprise an existing component of vehicle 10 that is used for another purpose. For example, actuator 32 may comprise a door handle, a trunk pad, or a keypad that is accessible from an exterior of vehicle 10 for use in requesting entry to vehicle 10. Actuator 32 may also comprise a pushbutton or similar actuator forming part of an ignition system and mounted on an instrument panel or steering column for use in starting vehicle 10. Actuator 32 is movable between first and second positions. Switch 34 is coupled to actuator 32 and assumes one state when actuator 32 is in a first position and a second state when actuator is in the second position. Switch 34 may, for example, comprise a pushbutton switch that switches states responsive to the position of actuator 32.

Display 36 is provided for use in displaying information to a user of vehicle 10 for use in certain embodiments of system 14 discussed in greater detail below. Display 36 may comprise a liquid crystal display or light emitting diode display and may comprise a touch screen display. Display 36 is disposed within the vehicle cabin and may be located in a center console of the vehicle or in an instrument panel. Display 36 may form part of a vehicle infotainment system, navigation system or collision avoidance system or may form a part of telematics unit 38.

Telematics unit 38 may comprise an OEM-installed (embedded) or aftermarket telematics unit that is installed in the vehicle 10 and that enables wireless voice and/or data communication over a wireless carrier system and via wireless networking. Unit 38 may enable communication between vehicle 10 and a call center, other telematics-enabled vehicles, or some other entity or device. Unit 38 can therefore be used to provide a diverse range of vehicle services that involve wireless communication to and/or from the vehicle 10. Such services include: turn-by-turn directions and other navigation-related services that are provided in conjunction with a GPS-based vehicle navigation system; airbag deployment or collision notification and other emergency or roadside assistance-related services that are provided in response to signals received from various vehicle control modules; diagnostic reporting using information obtained from vehicle control modules or diagnostic modules; and infotainment-related services where music, webpages, movies, television programs, videogames and/or other information is downloaded by an infotainment system and is stored for current or later playback. The above-listed services are by no means an exhaustive list of all of the capabilities of telematics unit 38, but are simply an enumeration of some of the services that telematics unit 38 is capable of offering. Telematics unit 38 may include a user interface 42, a network communication module 44, a wireless communication module 46 and a controller 48.

User interface 42 enables vehicle occupants to access or initiate various services through telematics unit 38 and to provide and receive information from a call center, other telematics-enabled vehicles or other entity or device. Interface 42 may include any combination of hardware, software and/or other components that enable a vehicle occupant to exchange information or data through unit 38. The interface 42 may therefore include input components such as a microphone 50, one or more pushbuttons 52, a touch-screen display or other input device where user interface 46 receives information from a vehicle occupant, as well as output components like an audio system 54, a visual display 56, or an instrument panel, where user interface provides information to the vehicle occupant. Microphone 50 provides audio input to the telematics unit 38 to enable the driver or other occupant to provide voice commands and carry out hands-free calling. For this purpose, it can be connected to an on-board automated voice processing unit utilizing human-machine interface (HMI) technology known in the art. The pushbutton(s) 52 allow manual user input into the telematics unit 38 to initiate wireless telephone calls and provide other data, response, or control input. Separate pushbuttons 52 can be used for initiating emergency calls versus regular service assistance calls. The audio system 54 provides audio output to a vehicle occupant and can be a dedicated, stand-alone system or part of the primary vehicle audio system providing AM, FM and satellite radio, CD, DVD and other multimedia functionality. This functionality can be provided in conjunction with or independent of an infotainment system (not shown) Visual display 56 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation. Some components of the interface 42, such as microphone 50 and pushbuttons 52 may be connected directly to the telematics unit 38 whereas others are indirectly connected using one or more network connections, such as vehicle communications bus 22. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. Some or all components of user interface 42 may be mounted on the vehicle's rear view mirror.

Network communication module 44 includes a network interface configured for connection to a telecommunications network 58. Network 58 may comprise the public internet, a local area network (LAN), wide area network (WAN), virtual private network (VPN) or other form of telecommunications network. Network 58 may include a wireless carrier system such as a cellular telephone system 60 that includes a plurality of cell towers 62 or cellular base stations (only one shown), one or more mobile switching centers (MSCs) 64 and other networking components required to connect wireless carrier system with a land-based telecommunications network 66. Each cell tower 62 includes sending and receiving antennas and a base station, with the base stations from different cell towers being connected to the MSC 64 either directly or via intermediary equipment such as a base station controller. System 60 can implement any suitable communications technology, including for example, analog technologies such as AMPS, or the newer digital technologies such as CDMA (e.g., CDMA2000) or GSM/GPRS. As an alternative or in addition to cellular telephone system 60, the wireless carrier system may comprise a satellite communication system 68 that provides uni-directional or bi-directional communication with the vehicle 10. System 68 may include communication satellites 70 and an uplink transmitting station 72. Uni-directional communication can be, for example, satellite radio services, wherein programming content (news, music, etc.) is received by transmitting station 72, packaged for upload, and then sent to the satellite 70, which broadcasts the programming to subscribers. Bi-directional communication can be, for example, satellite telephony services using satellite 70 to relay telephone communications between the vehicle 10 and station 72.

Using the wireless carrier network, telematics unit 44 may be connected to network 66 and, through network 66, to various computing devices 74 and/or to a call center 76. Network 66 may be a conventional land-based telecommunications network that is connected to one or more landline telephones and connects the wireless carrier system to computing devices 74 and call center 76. For example, network 66 may include a public switched telephone network (PSTN) such as that used to provide hardwired telephony, packet-switched data communications, and the Internet infrastructure. One or more segments of network 66 could be implemented through the use of a standard wired network, a fiber or other optical network, a cable network, power lines, other wireless networks such as wireless local area networks (WLANs), or networks providing broadband wireless access (BWA), or any combination thereof. Computing devices 74 can be used for various purposes and may comprise, for example, service center computers where diagnostic information and other vehicle data can be uploaded from the vehicle via the telematics unit 38, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. Call center 76 may provide vehicle 10 with a number of different system back-end functions including connections to human advisors, an automated voice response system, databases, servers and the like used in providing, for example, emergency or roadside assistance services and vehicle diagnostic services.

According to one embodiment, network communication module 44 is used for cellular communication according to either GSM, CDMA, or LTE standards and therefore includes a standard cellular chipset for voice communications like hands-free calling, a wireless modem (not shown) for data transmission, and a radio transceiver 78 that transmits signals to and receives signals from a dual antenna 80 for wireless communication with network 58. It should be appreciated that the wireless modem can either be implemented through software that is stored in a memory in the telematics unit 38 and is executed by controller 42, or it can be a separate hardware component located internal or external to telematics unit 38. The modem can operate using any number of different standards or protocols such as LTE, EVDO, CDMA, GPRS, and EDGE. Transceiver 78 may communicate with cell towers 62 through antenna 80 using communication topologies including frequency, time and code division multiple access topologies (i.e. FDMA, TDMA, CDMA). Unit 38 establishes a communications channel (a voice channel and/or a data channel) with the wireless carrier system so that voice and/or data transmissions can be sent and received over the channel. Data can be sent either via a data connection, such as via packet data transmission over a data channel, or via a voice channel using techniques known in the art. For combined services that involve both voice communication (e.g., with a live advisor or voice response unit at the call center 76) and data communication (e.g., to provide GPS location data or vehicle diagnostic data to the call center 76), the unit 38 can utilize a single call over a voice channel and switch as needed between voice and data transmission over the voice channel, and this can be done using techniques known to those skilled in the art. When used for packet-switched data communication such as TCP/IP, telematics unit 38 can be configured with a static IP address or can set up to automatically receive an assigned IP address from another device on the network such as a router or from a network address server.

Wireless communication module 46 is configured for short range wireless communication with short range wireless communication devices used in or near vehicle 10 including embedded vehicle systems and mobile communication devices carried by users of vehicle 10 such as key fobs, cellular phones (including smart phones) and portable computing devices that are not mechanically connected to vehicle 10 and are configured for wireless communication with module 46. Module 46 may communicate signals from short range wireless mobile communication devices to various vehicle systems (e.g., door locks or remote starting systems) for use in controlling those systems from the mobile communications devices. Module 46 also permits embedded vehicle systems and mobile communications devices to access telecommunications network 58 via network communication module 44. In this manner, telematics unit 38 may function as a wireless access point within vehicle 10 (i.e. a hotspot) for certain vehicle systems and mobile communications devices to access network 58. Module 46 may include any combination of hardware, software and/or other components that enable wireless voice and/or data communication between module 46 and short range wireless communication devices and, in particular, may include a wireless interface configured for short range wireless communication with such devices. Module 46 may include a radio transceiver 82 configured for short range wireless communication with mobile communications devices over an antenna 84 using short-range wireless technologies such as Wi-Fi (IEEE 802.11), WiMAX, Wi-Fi direct, Bluetooth, Zigbee, near field communication (NFC), etc.

Controller 48 is provided to control and manage communications among interfaces 44, 46, vehicle communications bus 22 and potentially dedicated hardwired connections within vehicle 10. Controller 48 may include a variety of electronic processing devices, memory devices, input/output (I/O) devices, and/or other known components, and may perform various control and/or communication related functions. In an exemplary embodiment, controller 48 includes an electronic memory device 86 that stores various look up tables or other data structures and software programs, etc. Controller 48 may also include an electronic processing device 88 (e.g., a microprocessor, a microcontroller, an application specific integrated circuit (ASIC), etc.) that executes instructions for software, firmware, programs, algorithms, scripts, etc. that are stored in memory device 86. Controller 48 may be a dedicated controller used only for telematics unit 38 or can be shared with other vehicle systems. Controller 48 may be electronically connected to other vehicle devices, modules and systems via vehicle communications bus 22 or other communication means and can interact with them when required.

The controller 40 for system 14 is provided to control one or vehicle subsystems 28, 30 in response to movement of actuator 32 in order to permit entry to vehicle 10 and/or start vehicle 10. Controller 40 may include a variety of electronic processing devices, memory devices, input/output (I/O) devices, and/or other known components, and may perform various control and/or communication related functions. In an exemplary embodiment, controller 40 includes an electronic memory device 90 that stores various look up tables or other data structures and software programs, etc. In accordance with one aspect of the present teachings, memory device 90 may store one or more authorization codes. Controller 40 may also include an electronic processing device 92 (e.g., a microprocessor, a microcontroller, an application specific integrated circuit (ASIC), etc.) that executes instructions for software, firmware, programs, algorithms, scripts, etc. that are stored in memory device 90. Controller 40 may be a dedicated controller used only for system 14 or can be shared with other vehicle systems. Controller 40 may be electronically connected to other vehicle devices, modules and systems via vehicle communications bus 22 or other communication means and can interact with them when required.

In accordance with one embodiment of the present teachings, controller 40 may be configured with appropriate programming instructions or code (i.e., software) to perform several steps in a method for keyless entry or start of vehicle 10. The code may be stored in memory device 90 of controller 40 and may be uploaded to memory device 90 from a conventional computer storage medium.

Figure 2:
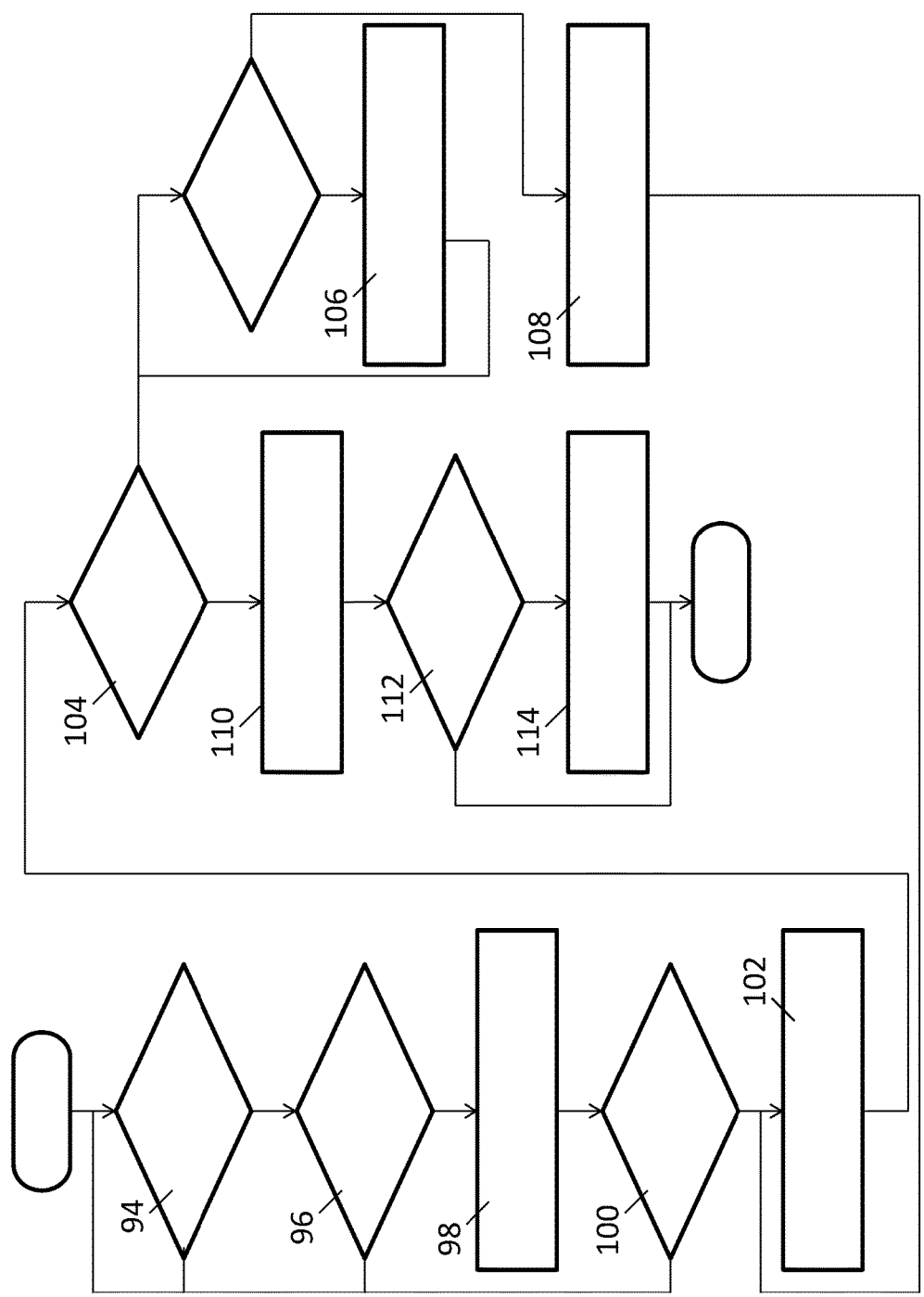
FIG. 2 is a flowchart diagram illustrating one embodiment of a method for keyless entry or start of a vehicle in accordance with the present teachings; and, FIG. 3 is a flowchart diagram illustrating another embodiment of a method for keyless entry or start of a vehicle in accordance with the present teachings.

Referring now to FIG. 2, one embodiment of the method may begin with the step 94 of detecting an initial actuation sequence of the actuator 32 used to signal the controller 40 that the user will subsequently be entering an access code to request entry to vehicle 10 or staring of vehicle 10. The initial actuation sequence may comprise, for example, a series of rapid actuations of actuator 32 in a short period of time or a single actuation of actuator 32 that is maintained for a relative long period of time. It should be understood, however, that various initial actuation sequences could be employed. In step 96, controller 40 may compare the initial actuation sequence to a predetermined actuation sequence. If the initial actuation sequence does not meet a predetermined condition relative to the predetermined actuation sequence (e.g., the initial actuation sequence is not the same as the predetermined actuation sequence), controller 40 may return to step 94 and await entry of an initial actuation sequence that meets the predetermined condition. If the initial actuation sequence meets the predetermined condition relative to the predetermined actuation sequence (e.g., the initial actuation sequence is the same as the predetermined actuation sequence), the method may proceed with the step 98 of monitoring switch 34 for receipt of an access actuation sequence entered using actuator 32 and corresponding to the access code. The controller 40 may be configured to monitor switch 34 for the access actuation sequence for only a predetermined period of time. Therefore, in step 100, controller may terminate monitoring of switch 34 for the access actuation sequence if the actuator 32 is not moved between positions before a predetermined amount of time has passed following receipt of the initial actuation sequence.

Assuming that the user begins to move actuator 32 before the predetermined amount of time has passed, the method may continue with the step 102 of detecting an access actuation sequence of actuator 32. The access actuation sequence comprises a specific manner of actuating actuator 32 that corresponds to, and represents, an access code. In accordance with one embodiment, the access code may comprise a plurality of digits and the access actuation sequence may comprise a number of movements of actuator 32 from one position to another position equal to each of the plurality of digits with the absence of movement of actuator 32 for a period of time corresponding to a transition between successive digits of the plurality of digits in the access code. For example, if the access code comprises 123, a user may move the actuator 32 from a first position to a second position one time, return the actuator 32 to the first position and pause, move the actuator 32 from the first position to the second position two times in a relatively short period of time, return the actuator 32 to the first position and pause, and then move the actuator 32 from the first position to the second position three times in a relatively short period of time. It should be understood, of course, that the time period between successive movements of actuator 32 when attempting to convey a digit should be less than the time period used to convey a transition between digits. Controller 40 may be configured to compare the times between movements of actuator 32 to predetermined thresholds in order to assess whether the user is entering a digit or is transitioning between digits. Alternatively, controller 40 may be configured to monitor the times between all of the movements of actuator 32 and then identify which movements correspond to digits and which movements correspond to transitions between digits based on differences in those times (e.g. by correlating the longest time periods to transitions between digits) so that system 14 is adaptable to different users. In accordance with another embodiment, the access code again comprises a plurality of digits and the access actuation sequence comprises periods of time during which the actuator 32 is in a first position and periods of time during which the actuator 32 is a second position. The periods of time during which the actuator 32 is in the first position correspond to one of the plurality of digits while the periods of time during which the actuator 32 is the second position correspond to a transition between successive digits in the plurality of digits. For example, if the access code comprises 123, a user may move the actuator 32 to the first position for one second, move the actuator 32 to the second position, move the actuator 32 back to the first position for two seconds, move the actuator 32 to the second position, and then move the actuator 32 to the first position for three seconds before returning the actuator 32 to the second position. It should be understood, however, that the time periods stated herein are exemplary and different time periods can be used as long as a functional relationship exists between the time periods and the digits used in the access code.

Once the access actuation sequence is detected and the access code identified, the method may continue with the step 104 of comparing the access code to an authorization code. The authorization code is a predetermined code permitting entry to, or starting of, vehicle 10 by a user. The authorization code may be stored in memory device 90 of controller 40. In accordance with some embodiments, controller 40 may be configured to receive an authorization code from telematics unit 38. In situations where a user has forgotten the authorization code, the user may request that a new or replacement authorization code be transmitted to vehicle 10 through telematics unit 38. The user may call a telematics service provider and request that a new or replacement authorization code be transmitted to vehicle 10. After verifying that the user is authorized to make use of vehicle 10, the service provider can transmit a new or replacement authorization code to vehicle 10 through telematics unit 38 and advise the user of the new code (alternatively, if the service provider cannot transmit a new or replacement authorization code through telematics unit 38 because, for example, connectivity cannot be established with telematics unit 38, the service provider can advise the user of an existing "reserve" or "backup" authorization code stored in memory device 90). The user can then request entry to vehicle 10 and/or start vehicle 10 using the methods described herein. In addition to receiving a new or replacement authorization code from telematics unit 38 at a user's request, controller 40 may be configured to receive new or replacement authorization codes from telematics unit 38 that are sent in response to a request from controller 40 or automatically in accordance with a predetermined process by the telematics service provider. For security reasons, it may be advisable to change the authorization code periodically. Controller 40 may be configured to periodically generate signals to telematics unit 38 to cause telematics unit 38 to request new or replacement authorization codes and to receive signals from telematics unit 38 indicative of new or replacement authorization codes. Even if not requested by controller 40, new or replacement authorization codes may be transmitted to telematics unit 38 and from telematics unit 38 to controller 40 and controller 40 may be configured to receive the codes. The new or replacement authorization codes can be conveyed to a user of vehicle 10 through a text message, a software application on a phone or other means of communication.

If the access code entered by the user does not correspond to the authorization code (e.g., is not the same as the authorization code), controller 40 may be configured to perform the step 106 of ignoring any subsequent actuation sequence until a predetermined period of time has passed following entry of the access actuation sequence. The delay in time can be useful in preventing attempts at unauthorized use of vehicle 10 and in identifying the start and end of actuation sequences. Further, controller 40 may be configured to increase the predetermined period of time that the user must wait to attempt to enter a new access actuation sequence each time that the entered access actuation sequence does not correspond to the authorization code to discourage repeated attempts by unauthorized users. Controller 40 may be further configured to perform the step 108 of generating a control signal after the predetermined period of time has passed to cause vehicle 10 to alert the user that the user can reattempt entry or starting of vehicle 10. In accordance with one embodiment, controller 40 may be configured to generate a control signal to body control module 12 to cause module 12 to actuate one or both of the horn 16 or exterior lights 18 in order to provide an audio or visual alert to the user.

If the access code entered by the user does correspond to the authorization code (e.g., the access code is the same as the authorization code), controller 40 may be configured to perform the step 110 of generating a control signal to cause a vehicle subsystem to change states. In the case of lock system 28, the control signal may be configured to cause a lock to switch from a locked state to an unlocked state (e.g., by activating a motor driving an actuator that controls a latch). In the case of start system 30, the control signal may be configured to cause a starter motor of the start system to switch from an inactive state to an active state (e.g., by activating a solenoid that controls delivery of electrical power from a vehicle battery to the starter motor) or, for an electric vehicle, to enable power to be supplied (via a relay or otherwise) to the powertrain system for use by the one or more electric motors that drive the wheel(s). In the case where a user is requesting entry to vehicle 10 using the access code, starting of the vehicle may be controller in any of several ways. In one embodiment, controller 40 may generate multiple a control signals in response to the single entry of the access code to cause changes in the state of both the lock system 28 and starter system 30. In another embodiment, controller 40 may perform selected steps such as steps 98, 100, 102, 104, 110 a second time wherein the user enters the same access code again using a different actuator (e.g., a pushbutton on the instrument panel) or enters a different access code (specific to starter system 30) using one of actuators 32. Controller 40 may be further configured in step 112 to determine whether a user has entered vehicle 10 after the vehicle 10 has been unlocked and/or started and in step 114 to return the vehicle subsystem to its prior state or a default state if the controller 40 does not detect the presence of the user with a predetermined period of time. In other words, if the user does not enter vehicle 10 after requesting entry to vehicle 10, controller 40 may be configured to generate control signals that cause the lock of lock system 28 to return to a locked state and/or the starter motor of starter system 30 to return to an inactive state. Controller 40 may determine whether a user has entered vehicle 10 in various ways including, but not limited to, signals from switches and sensors that indicate that a vehicle door is ajar, that a weight is present on a vehicle seat, that an infotainment system is active, or that a temperature change has occurred in the vehicle cabin.

Referring now to FIG. 3, another embodiment of a method for enabling access to vehicle 10 and/or starting vehicle 10 is illustrated. Several of the steps performed in this embodiment of the method may be substantially the same as the steps in the embodiment illustrated in FIG. 2 and a description of these steps may be found above. The embodiment shown in FIG. 3 differs from the embodiment shown in FIG. 2 in that, if the initial actuation sequence meets the predetermined condition relative to the predetermined actuation sequence (e.g., the initial actuation sequence is the same as the predetermined actuation sequence) in step 96, the method may continue with several steps designed to solicit entry of an access authentication sequence from the user and determine whether the access authentication sequence corresponds to a previously stored authorization code. The steps may include the step 116 of transmitting output signals to display 36 that are configured to cause display 36 to display a plurality characters. The plurality of characters will include a character of the authorization code. For example, if the authorization code is 123 or ABC, the output signals from controller 40 may cause display 36 to cycle through digits 0 through 9 or letters A-Z (or a subset thereof). The characters may be presented in a logical order (e.g., 0, 1, 2, 3 . . . or A, B, C, D, E . . . ) or may be presented in a random order (e.g., 4, 9, 7, 1 . . . or M, J, O, A . . . ). In step 118, controller 40 detects an actuation of actuator 32 based on the state of switch 34. In step 120, controller 40 determines whether the character shown on display 36 during the actuation of actuator 32 meets a predetermined condition relative to a character of the authorization code. For, example if the access code is 123, controller 40 may determine whether the user actuated actuator 32 while "1" was displayed on display 36.

If the character shown on display 36 during actuation of actuator 32 does not comprise the character of the authorization code, controller 40 may again be configured to perform the steps 106, 108 of ignoring any subsequent actuation sequence until a predetermined period of time has passed following entry of the access actuation sequence and then generating a control signal after the predetermined period of time has passed to cause vehicle 10 to alert the user that the user can reattempt entry or starting of vehicle 10.

If the character shown on display 36 during actuation of actuator 32 does comprise the character from the authorization code, controller 40 may be configured in step 122 to transmit another output signal to display 36 in order to cause display 36 to indicate to the user that the user has properly identified a character in the authorization code (i.e., that the character shown on display 36 during actuation of actuator 32 comprises the character of the authorization code). The output signal may, for example, cause a change in color of the character shown on display 36, a change in the color of the screen or provide some other visual indicator to the user. Controller 40 may be configured to repeat steps 116, 118, 120, 122 for each additional character of the authorization code. If the user actuates actuator 32 at appropriate times such that the actuation sequence corresponds to the authorization code, controller 40 may again be configured to perform the step 110 of generating a control signal to cause a vehicle subsystem to change states as described above. In this way, access to or starting of the vehicle may be carried out by the user without the need for a PEPS key fob or other access device.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A keyless control system for a vehicle, comprising:
an actuator mounted on the vehicle and movable between first and second positions;
a switch coupled to the actuator, the switch assuming a first state when the actuator is in the first position and a second state when the actuator is in the second position, wherein the switch is a two-position switch that includes only two operable positions, and wherein a first one of the two operable positions corresponds to the first state and a second one of the two operable positions corresponds to the second state;
a display disposed in a cabin of the vehicle; and
a controller coupled to the switch and the display and configured to:
detect a first actuation sequence of the actuator as a succession of changes in state of the switch resulting from corresponding successive movements of the actuator between the first and second positions, the first actuation sequence corresponding to an access code, wherein the first actuation sequence is used to convey a plurality of digits comprising the access code, wherein for each of the plurality of digits of the access code, the number of successive movements of the actuator between the first and second positions is equal in number to the digit being conveyed, and pauses during the successive movements of the actuator that are longer in duration than a threshold time period identify transitions between each of the plurality of digits during the conveyance of the digits;
compare the access code to a predetermined authorization code saved to a memory accessible by the controller;
generate a first control signal configured to allow access to an interior compartment of the vehicle or to cause starting of the vehicle when the access code corresponds to the predetermined authorization code; and
control the display to display characters associated with each digit of the access code that provides visual validation during entry of the first actuation sequence.

2. The keyless control system of claim 1, wherein the vehicle includes a lock configured to control access to the interior compartment of the vehicle, the actuator is accessible from an exterior of the vehicle, and the first control signal moves the lock from a locked state to an unlocked state.

3. The keyless control system of claim 1, wherein the vehicle includes a starter motor and the first control signal causes the starter motor to move from an inactive state to an active state.

4. The keyless control system of claim 1, wherein the controller is further configured to:
detect a second actuation sequence of the actuator as a succession of changes in state of the switch resulting from corresponding successive movements of the actuator between the first and second positions;
compare the second actuation sequence to a predetermined activation sequence saved to the memory accessible by the controller;
monitor the switch for the first actuation sequence in response to determining that the second actuation sequence corresponds to the predetermined activation sequence.

5. The keyless control system of claim 4, wherein the controller is further configured to terminate monitoring the switch for the first actuation sequence when the actuator is not moved between the first and second position before a predetermined amount of time has passed following receipt of the second actuation sequence.

6. The keyless control system of claim 1, wherein the controller is further configured, if the access code does not correspond to the predetermined authorization code, to ignore a second actuation sequence of the actuator as a succession of changes in state of the switch resulting from corresponding successive movements of the actuator between the first and second positions when said second actuation sequence occurs less than a predetermined period of time after entry of the first actuation sequence.

7. The keyless control system of claim 6, wherein the controller is further configured to generate a second control signal after the predetermined period of time has passed, the second control signal configured to cause the vehicle to generate at least one of an audio or visual alert.

8. The keyless control system of claim 1, further comprising a telematics unit in communication with the controller and wherein the controller is further configured to receive the predetermined authorization code from the telematics unit.

9. A keyless control system for a vehicle, comprising:
an actuator mounted on the vehicle and movable between first and second positions;
a switch coupled to the actuator, the switch assuming a first state when the actuator is in the first position and a second state when the actuator is in the second position, wherein the switch is a two-position switch that includes only two operable positions, and wherein a first one of the two operable positions corresponds to the first state and a second one of the two operable positions corresponds to the second state;
a display disposed in a cabin of the vehicle; and
a controller coupled to the switch and the display and configured to:
determine whether an initial actuation sequence of the actuator, defined by successive movements of the actuator between the first state and the second state, corresponds to a predetermined activation sequence saved to a memory accessible by the controller by;
when the initial actuation sequence of the actuator does not correspond to the predetermined activation sequence, after a first predetermined amount of time, clear the initial actuation sequence of the actuator so as to allow a user to re-attempt matching the predetermined activation sequence; and
once the initial actuation sequence of the actuator corresponds to the predetermined activation sequence transmit an output signals to the display, the output signals configured to cause the display to display a single character of a set of characters for a second predetermined amount of time, after the second predetermined amount of time, carry out the transmitting action for a different character of the set of characters so that the different character is displayed as the single character on the display for the second predetermined amount of time, detect actuation of the actuator during the second predetermined amount of time for any given single character on the display, wherein the single character currently displayed at the time of actuation of the actuator is stored as an entered character of a first actuation sequence, repeat the transmitting, carrying out, detection, and storing actions at least until a determination can be made as to whether the sequence of entered characters in the first actuation sequence matches a sequence of characters in a predetermined authorization code saved to a memory accessible by the controller, when the determination is made that the first actuation sequence does not correspond to the predetermined authorization code, clear the first actuation sequence so as to allow a user to re-attempt matching the predetermined authorization code, and increment a counter, when the counter is incremented to a threshold count value, cause the display to either turn off or to present a visual alert to the user of a failed attempt to correctly enter the predetermined authorization code, generate a first control signal configured to allow access to an interior compartment of the vehicle or to cause starting of the vehicle when the first actuation sequence corresponds to the predetermined authorization code, and reset the counter.

10. The keyless control system of claim 9, wherein the vehicle includes a lock configured to control access to the interior compartment of the vehicle, the actuator is accessible from an exterior of the vehicle, and the first control signal moves the lock from a locked state to an unlocked state.

11. The keyless control system of claim 9, wherein the vehicle includes a starter motor and the first control signal causes the starter motor to move from an inactive state to an active state.

12. The keyless control system of claim 9, wherein the controller is further configured, if the first actuation sequence does not correspond to the predetermined authorization code, to ignore a second actuation sequence of the actuator when said second actuation sequence occurs less than a third predetermined period of time after entry of the first actuation sequence.

13. The keyless control system of claim 9, wherein the controller is further configured to generate a second control signal after the counter reaches the threshold count value, the second control signal configured to cause the vehicle to generate at least one of an audio or visual alert.

14. The keyless control system of claim 9, further comprising a telematics unit in communication with the controller and wherein the controller is further configured to receive the predetermined authorization code from the telematics unit.

15. The keyless control system of claim 9, wherein the controller is further configured, while determining whether the first actuation sequence corresponds to the predetermined authorization code, to transmit another output signal to the display whenever the character shown on the display during the actuation of the actuator comprises a corresponding character of the predetermined authorization code, the another output signal configured to cause the display to visually indicate that the character shown on the display during the actuation of the actuator comprises the corresponding character of the predetermined authorization code.

16. The keyless control system of claim 15, wherein the another output signal causes a change in color of the character currently shown on the display.

17. The keyless control system of claim 9, wherein each character of the set of characters comprises a digit.

* * * * *